United States Patent [19]

Klahn et al.

[11] 4,195,869

[45] Apr. 1, 1980

[54] TUBULAR CLOSURE DEVICE

[75] Inventors: Francis C. Klahn, Madison Heights, Va.; John H. Nolan, Rochester, Mich.; Christopher Wills, Forest, Va.

[73] Assignee: The Babcock & Wilcox Company, New Orleans, La.

[21] Appl. No.: 878,961

[22] Filed: Feb. 17, 1978

[51] Int. Cl.² ............................................. E05C 19/06
[52] U.S. Cl. ............................................. 292/256.67
[58] Field of Search ...................... 292/19, 49, 256.67

[56] References Cited

U.S. PATENT DOCUMENTS

| | | | |
|---|---|---|---|
| 2,732,234 | 1/1956 | Lundell | 292/256.67 X |
| 3,669,481 | 6/1972 | Bergmann | 292/49 |
| 3,921,334 | 11/1975 | Black, Sr. | 292/49 X |
| 4,057,935 | 11/1977 | Rohrberg et al. | 292/19 X |

*Primary Examiner*—Richard E. Moore
*Attorney, Agent, or Firm*—Robert J. Edwards; Robert H. Kelly

[57] ABSTRACT

A closure device for closing a tubular opening and releasably securing articles therein is disclosed. The device includes axially movable latching and actuator members which, respectively, engage the tubular opening and actuate or deactivate the latching means. Locking means are provided for releasably locking these members to prevent axial movements.

5 Claims, 6 Drawing Figures

FIG. 1
FIG. 2
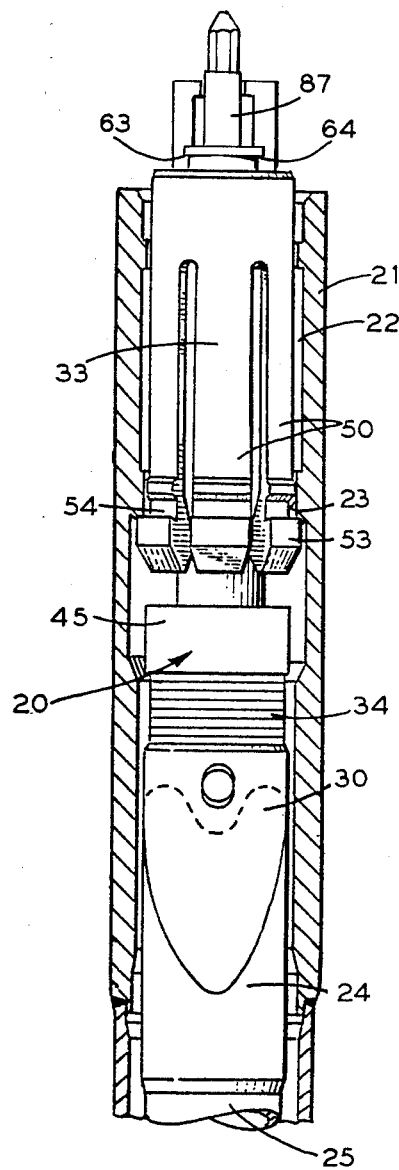
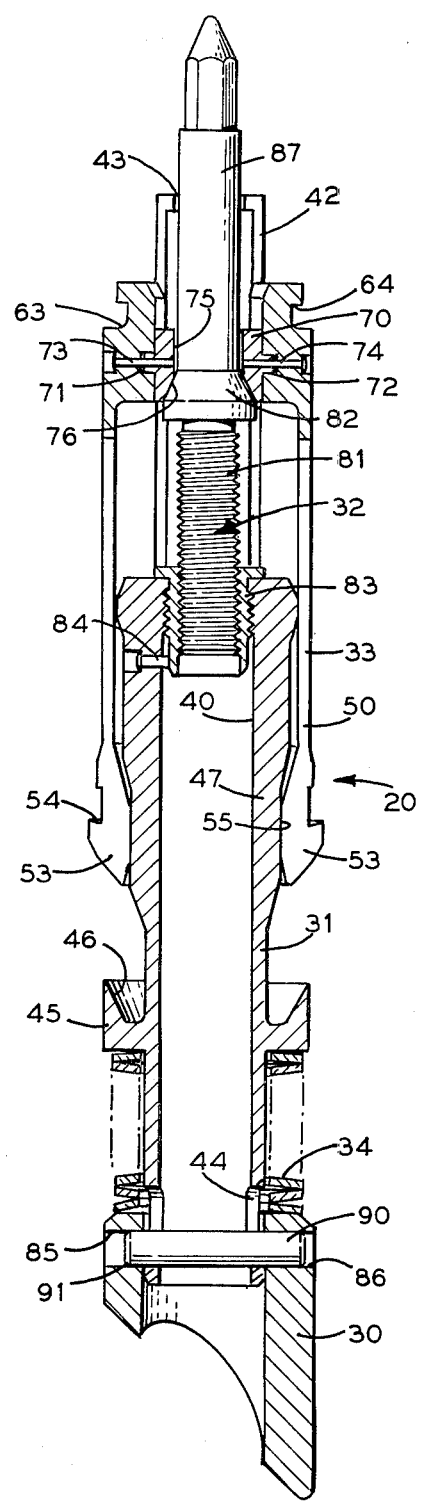

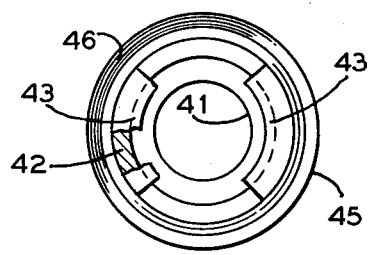
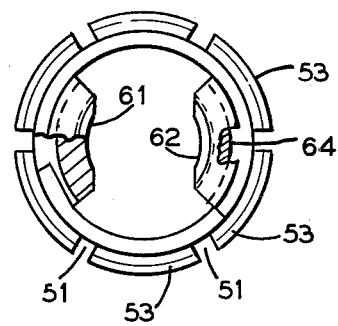
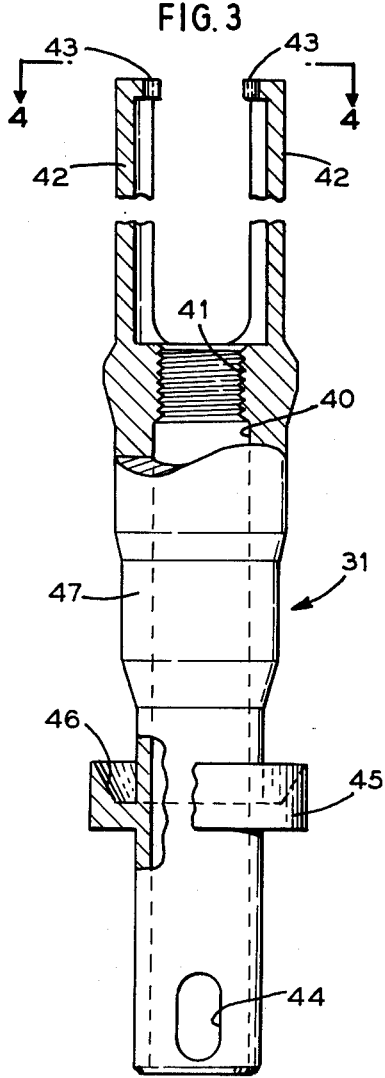
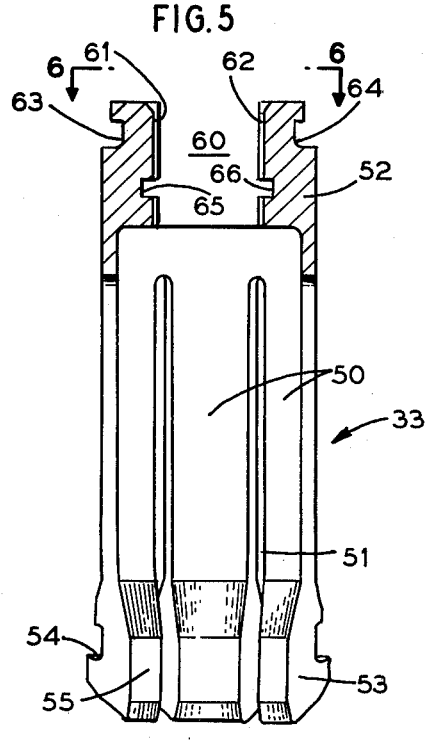

TUBULAR CLOSURE DEVICE

BACKGROUND OF THE INVENTION

This invention relates to a closure mechanism for closing openings such as the bore of a conduit and for releasably securing members within the bore, and, more particularly, this invention relates to a closure mechanism for tubular irradiation surveillance specimen assembly holders used in nuclear reactors.

Reactor vessel material surveillance programs are designed to monitor the radiation and temperature induced changes occuring in the mechanical properties of a vessel throughout its operating life. Typically, surveillance test specimens are prepared from the actual material used in fabricating the irradiated region of the reactor vessel. The surveillance specimens are generally loaded into specimen containing capsules which, in turn, are assembled in holder assemblies inside the reactor vessel within the belt line region, defined as that region which directly surrounds the effective height of the fuel element assemblies. The surveillance capsules are located near the inside vessel wall so as to receive a neutron and thermal exposure that is representative of the exposures of the reactor vessel being monitored in order to duplicate, as closely as possible, the neutron-flux spectrum, temperature history, and maximum accumulated neutron fluence of the vessel.

The holder assemblies and surveillance capsules must permit periodic removal of the capsules and insertion of replacement capsules. Thus, the holder assemblies and surveillance capsules must be designed to facilitate withdrawal of the surveillance capsules and insertion of replacement capsules. The holder assemblies, in addition, must adequately restrain the capsules to preclude damage to or failure of the capsules due to coolant pressure and flow under both steady state and transient conditions.

In some surveillance specimen assembly designs, the specimen capsules have been longitudinally stacked and housed in vertically oriented, hollow elongated containers or holders. These elongated containers have generally been much longer than the total length of the capsules, and include an upper portion oriented above the beltline region to facilitate transfer of the capsules during insertion and removal operations. Hence, the longitudinal restraints have often taken the form of elongated bars, and the like, which traverse the distance from the top of the container to the uppermost capsule and, through spring loading, longitudinally restrain the capsules. Lateral clearances are required to permit capsule insertion and removal. Hence, in some previous designs, lateral restraint of the capsules has been omitted. In other designs lateral restraint of the capsules has been effected by limited contact of the capsules with the container wall. There are a number of inherent disadvantages to such arrangements. The spring loaded elongated longitudinal restraints have often been found to be subject to vibratory loadings that result in wear and eventual failure of the surveillance specimen assembly, particularly where lateral restraints are omitted or the capsules are subjected to hydraulic conditions which are conducive to inducing vibration. However, it remains necessary to accommodate differential thermal expansions between the specimen containing capsules and their holders.

Thus, there exists a need for a closure mechanism which can adequately restrain the specimen capsules in a holder tube without vibration while accommodating expected thermal expansions. The closure mechanism must be releasably securable and, because of its radioactive operating environment, must be capable of being handled by remote means.

SUMMARY OF THE INVENTION

In accordance with the principles of the invention, a closure mechanism is presented which closes the opening of a circular bore, such as a tube, and releasably secures articles, such as surveillance specimen capsules, within the bore.

The closure mechanism is composed of a latching member which includes a generally circular chamber with a plurality of elongated latches depending therefrom. The latching member circumscribes part of an actuator member which is designed to actuate positioning of the latches. The latching and actuator members are axially movable with respect to each other between a position in which the latches are locked to the tubular bore and a position in which they are secured within the actuator member. Locking means are provided for releasably locking the actuator and latching member to prevent axial movements.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts through the same, FIG. 1 is a side view, partly in section, illustrating a tube closed by a closure mechanism in accordance with the invention;

FIG. 2 is a cross sectional view of a closure mechanism constructed in accordance with the invention;

FIG. 3 is a cross sectional view of a member of the closure mechanism of FIG. 2;

FIG. 4 is an end view of the member of FIG. 3 taken along line 4—4;

FIG. 5 is a side view of another member of the closure mechanism of FIG. 2; and

FIG. 6 is an end view of the member of FIG. 5 taken along line 6—6.

DESCRIPTION OF THE PREFERRED EMBODIMENTS

For further details concerning the construction of a surveillance specimen assembly, see co-pending application Ser. No. 878,955, filed Feb. 17, 1978. The constructional details of the surveillance specimen assembly are not part of the disclosed invention and, apart from the means whereby the closure mechanism is attached to the holder tube and engages a specimen capsule, will not be described herein.

FIG. 1 illustrates a closure mechanism 20 closing the upper end of a surveillance specimen holder tube 21 formed with a bore 22 and an inner annular lip 23 that radially projects the inner wall of the tube into the bore 22. The closure mechanism 20 intermeshes with an upper end fitting 24 of a surveillance specimen capsule 25 and releasably secures the capsule under load within the bore 22.

The closure mechanism 20, as shown in FIG. 2, generally includes a lower V-shaped end fitting 30, an elongated actuator member 31 connected at its lower end to the end fitting 30, a locking element 32 which threadably engages the upper end of the actuator member via an insert 83, and a latching member 33 which slidably receives and substantially circumscribes the upper portion of the actuator member. A stack of washer-type or disc springs 34 circumscribes, in part, the lower end of the actuator member above the end fitting 30.

The elongated actuator member 31, as best shown in FIGS. 3 and 4, is a generally cylindrical structure having a central longitudinal bore 40 that is partly threaded at 41. The upper end, as illustrated in FIG. 3, of the actuator member is longitudinally furcated into two sections 42. Each section 42 is provided at its extremity with a radial lip 43 that projects radially inward. Diametrically opposed oval apertures 44 are formed in the walls of the actuator member near its lower end. Each aperture 44 is disposed with its major axis generally parallel to the longitudinal axis of the actuator member. The outer surface of the actuator member 31 includes an integral collar 45 containing an upper recess 46, and a camming surface 47 which is designed to interact with the latching member as described hereinafter.

The latching member 33, as illustrated in FIGS. 5 and 6, is a slotted generally hollow cylindrical structure having a plurality of elongated latching fingers or latches 50, circumferentially spaced by elongated slots 51. The latches 50 longitudinally depend, in cantilevered fashion, from one end of a generally cylindrical chamber 52. Each latching finger 50 is formed, at its free end, with an outer heel 53, generally extending radially outward, which includes an outwardly oriented C-shaped clamping surface 54 adapted to engage the annular lip 23 of the holder tube 21 (FIG. 1). An inner camming surface 55 (FIG. 5) is formed on the inside surface of each latching member opposite the outer heel 53. The camming surface 55 is designed to interact with the camming surface 47 of the actuator member. The chamber 52 has a broached bore 60 with two arcuate circumferentially spaced lugs 61, 62 projecting radially inward of the chamber that are designed for cooperation with the actuator member 31 to permit relative rectilinear motion with the latching member 33 as is described hereinafter. The lugs 61, 62, which in the preferred embodiment are spaced diametrically opposite each other, longitudinally extend beyond the chamber 52. Circumferential notches 63, 64 are respectively formed in the outer surfaces of the portion of the lugs 61, 62 extending beyond the chamber. Arcuate grooves 65, 66, disposed laterally with respect to the longitudinal axis of the latching member, are respectively cut in the inner face of the lugs 61, 62 adjacent the bore 60. In this regard, the chamber 52 includes a cylindrical insert 70 (FIG. 2) constructed with two interrupted outer circumferential collars 71, 72 configured to interfit within the arcuate grooves 65, 66. The insert is clamped to the latching member 33 by clamping pins 73, 74. The insert 70 includes a cylindrical bore 75, which has a conically expanded surface 76 at its lower end.

As shown in FIG. 2, the closure mechanism basically includes a locking element 32 longitudinally extending into the bore 40 of the actuator member 31 and projecting from its upper end. The locking element 32 includes a threaded body portion 81, which threadably engages the actuator at 41 via insert 83, a conical collar 82 which is shaped complementary with respect to the conical surface 76 of the insert in order to promote locking and an unthreaded portion 87 which may be engaged for rotating the element, as is described hereinafter. As shown in FIG. 2, the cylindrical insert 83, internally and externally threaded, may be radially located between the threaded portion 41 of the actuator and that 81 of the locking screw. In the preferred embodiment, the insert 83 is fixed to the actuator member 31 by a shear pin 84, and is provided with internal and external threads having a right handed orientation.

Mounted about the lower end of the closure mechanism 20 is the V-shaped end fitting 30. The end fitting 30 contains diametrically opposed openings 85, 86. A dowel pin 90 extends through the oval openings 44 of the actuator member and is received in the openings 85, 86 of the end fitting. The end fitting 30 is spring loaded by the spring stack 34 which bears against the top of end fitting 30 and bottom of the collar 45. The end fitting 30 is axially extensible within the length of the major axis of the oval openings 44 in the actuator member but is restrained from rotary or lateral movements by the dowel pin 90, which is fixed to the end fitting at 91 by welding, or other known means.

The upper recess 46 in the collar 45 of the actuator member 31 serves to retain and house the outer heels 53 of the latches 50 to facilitate insertion and removal of the closure mechanism from the tubular openings which it is designed to close. During insertion and removal operations, the locking element 32 is maintained in a neutral position, that is, it is rotated and translated such that its conical collar 82 is out of engagement with the conically expanded surface 76 of the insert 70.

In operation, the closure mechanism 20 is partly inserted into the bore of a conduit such as the holder tube 21 as is shown in FIG. 1 such that the end fitting 30 intermeshes with the upper end fitting 24 of the adjacent specimen capsule 25. The latching member 33 is pulled axially upward, relative to the actuator, by a tool (not shown) which engages the notches 63, 64. The translation of the latching member 33 causes the camming surface 47 (see FIG. 2) of the actuator member 31 to interact sliding contact with the camming surface of each latch 50 such that the latches 50 move radially outward to engage the annular lip 23 (FIG. 1) of the holder tube 21. The specimen capsule 25 is loaded by continuing to apply an axially upward force to the latching member 33 and concurrently pushing the actuator in the opposite direction until the desired loading is attained. Once the desired load is obtained, the locking element 32 is rotated, by engaging portion 87 with any suitable tool (not shown) from its neutral position until its conical collar 82, as shown in FIG. 2, engages the conically expanded surface 76 of the insert 70 in order to achieve a friction lock.

The insert 83 (FIG. 2) is utilized in the preferred embodiment to provide means to facilitate manufacturing of the high precision threads of the insert which after assembly mate with the threaded portion of the locking element 32. The clamping pins 73, 74 are used to hold the cylindrical insert 70. These pins can be sheared with a tool, not shown, to facilitate extraction of the closure mechanism in the event that the threads of the locking element become damaged.

In the locked position of the closure mechanism, the C-shaped surface 54 of the heels 53 of the latches are restrained against radial movement by the interaction of the camming surface 47 of the actuator which presses against the camming surface 55 on the latches.

Thus, the closure mechanism 20 can be used to load and restrain surveillance specimen capsules. The spring biasing of the end fitting accommodates thermal expansions.

By varying the conical angles of the locking element collar 82 and of the conical surface 76 on the insert 70, friction locks can be designed capable of resisting various applied torques. This type of locking feature requires no metal deformation which, after a number of insertions and removal operations, promote material fatigue or functional degradation or both.

The terms longitudinal or axial, as used in the specification and claims, to modify movement are intended to connote movements along a lengthwise axis. Longitudinal spacing is meant to imply spaced apart in a longitudinal plane.

The embodiments of the invention in which an exclusive property or privilege is claimed are defined as follows:

1. An apparatus for releasably securing articles under a longitudinal load within a bore of a tubular member and for closing the bore comprising: a latching member having a cylindrical section and a plurality of circumferentially spaced elongated latches longitudinally depending, in cantilevered fashion, from one end of the cylindrical section; an elongated actuator member slidably received within the latching member; the actuator member and latching member being axially movable with respect to each other; the actuator member having camming means contacting the latches for actuating radial movement of the latches, responsive to axial movement of the actuator member or the latching member, between a first position in which the latches engage the walls of the tubular member and a second position in which the latches are secured from contact with the walls of the tubular member; locking means, operatively connected to the actuator member, for releasably locking the actuator member and the latching member to prevent axial movements relative to each other and the tubular member; and means operatively connected to the actuator member for engaging the articles within the bore of the tubular member in response to axial movement of the actuator member.

2. An apparatus as defined in claim 1 further comprising spring means operatively connected to the actuator member for biasing the article engaging means.

3. An apparatus as defined in claim 1, wherein the actuator member includes a partly threaded longitudinal bore; and the locking means includes a locking element threadably engaging the actuator member, the locking element having means for frictionally engaging the latching member for releasably locking the actuator member and latching member to prevent axial movements thereof.

4. An apparatus as defined in claim 3, further comprising a cylindrical insert disposed radially between the locking element and latching member, the insert having a conically shaped inner surface; and a conical collar integrally formed on the locking element for engaging the conical inner surface of the insert.

5. An apparatus as defined in claim 1 or 2 or 3, wherein the means for engaging the articles includes an end fitting extensibly attached to the actuator member.

* * * * *

UNITED STATES PATENT AND TRADEMARK OFFICE
CERTIFICATE OF CORRECTION

PATENT NO. : 4,195,869

DATED : April 1, 1980

INVENTOR(S) : Francis C. Klahn, John H. Nolan, et al

It is certified that error appears in the above—identified patent and that said Letters Patent is hereby corrected as shown below:

Column 4, line 47 insert the word--in--after the word "interact".

Signed and Sealed this

Fourth Day of May 1982

[SEAL]

Attest:

GERALD J. MOSSINGHOFF

Attesting Officer     Commissioner of Patents and Trademarks